US012574180B2

(12) United States Patent
Shi et al.

(10) Patent No.: US 12,574,180 B2
(45) Date of Patent: Mar. 10, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventors: Zhihua Shi, Dongguan (CN); Jiejiao Tian, Dongguan (CN); Wenhong Chen, Dongguan (CN); Yingpei Huang, Dongguan (CN); Yun Fang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 331 days.

(21) Appl. No.: 18/137,866

(22) Filed: Apr. 21, 2023

(65) Prior Publication Data

US 2023/0261835 A1      Aug. 17, 2023

Related U.S. Application Data

(63) Continuation of application No. PCT/CN2020/122526, filed on Oct. 21, 2020.

(51) Int. Cl.
*H04L 5/00* (2006.01)

(52) U.S. Cl.
CPC .......... *H04L 5/0051* (2013.01); *H04L 5/0092* (2013.01)

(58) Field of Classification Search
CPC .......... H04B 7/04; H04B 7/06; H04B 7/0602; H04B 7/0686; H04B 7/0691;
(Continued)

(56) References Cited

U.S. PATENT DOCUMENTS

| 2019/0356431 A1 | 11/2019 | Manolakos et al. |
| 2019/0356445 A1 | 11/2019 | Manolakos |

(Continued)

FOREIGN PATENT DOCUMENTS

| CN | 109802801 A | 5/2019 |
| CN | 110474727 A | 11/2019 |

(Continued)

OTHER PUBLICATIONS

Communication pursuant to Article 94(3) EPC for European Application No. EP20958094.3 mailed on Jan. 16, 2025.
(Continued)

*Primary Examiner* — Paul H. Masur
(74) *Attorney, Agent, or Firm* — Sheppard, Mullin, Richter & Hampton LLP

(57) ABSTRACT

The embodiments of the present disclosure provide a wireless communication method and device, capable of completing an aperiodic sounding process corresponding to a 1T4R-type antenna switching within one slot, thereby reducing the sounding delay. The wireless communication method includes: receiving, by a terminal device, configuration information, the configuration information indicating G Sounding Reference Signal (SRS) resource sets, the G SRS resource sets including a first SRS resource set, where G is an integer and G≥1. A resource type configuration corresponding to the first SRS resource set is aperiodic, the first SRS resource set corresponds to a 1T4R-type antenna switching configuration, the four SRS resources in the first SRS resource set are on different symbols of a same slot, and the four SRS resources are 1-port SRS resources.

18 Claims, 4 Drawing Sheets

200

Terminal Device

First Device

S210: First device transmits configuration information to terminal device, the configuration information indicating G SRS resource sets, and the G SRS resource sets including a first SRS resource set, where G is an integer and G≥1, a resource type configuration corresponding to the first SRS resource set being aperiodic, the first SRS resource set corresponding to a 1T4R-type antenna switching configuration, four SRS resources in the first SRS resource set being on different symbols of a same slot, and the four SRS resources being 1-port SRS resources S220: Terminal device receives the configuration information

(58) Field of Classification Search
CPC .. H04B 7/0802; H04B 7/0808; H04B 7/0811;
H04B 7/0868; H04B 7/0874; H04L
25/0226; H04L 5/0048; H04L 5/0051;
H04L 5/0091; H04L 5/0092–0096
See application file for complete search history.

(56) References Cited

U.S. PATENT DOCUMENTS

| | | | | |
|---|---|---|---|---|
| 2020/0112970 | A1 | 4/2020 | Manolakos et al. | |
| 2021/0112498 | A1* | 4/2021 | Duan | H04B 7/0817 |
| 2021/0194737 | A1* | 6/2021 | Gao | H04W 72/53 |
| 2022/0029861 | A1* | 1/2022 | Shahmohammadian | |
| | | | | H04L 5/0048 |
| 2022/0060307 | A1* | 2/2022 | Manolakos | H04L 5/0048 |
| 2022/0393826 | A1* | 12/2022 | Shi | H04L 5/0051 |
| 2023/0009319 | A1* | 1/2023 | Manolakos | H04L 5/0007 |
| 2023/0033260 | A1* | 2/2023 | Rupasinghe | H04L 5/0051 |
| 2023/0047048 | A1* | 2/2023 | Liu | H04B 7/0417 |
| 2023/0147639 | A1* | 5/2023 | Go | H04L 5/0023 |
| | | | | 455/101 |
| 2023/0224124 | A1* | 7/2023 | Nilsson | H04L 5/0094 |
| | | | | 370/330 |

FOREIGN PATENT DOCUMENTS

| | | | | |
|---|---|---|---|---|
| TW | 201919423 | A | 5/2019 | |
| WO | 2019218108 | A1 | 11/2019 | |
| WO | 2020056180 | A1 | 3/2020 | |
| WO | WO-2022110217 | A1 * | 6/2022 | H04L 5/0048 |
| WO | WO-2022131766 | A1 * | 6/2022 | H04W 72/54 |

OTHER PUBLICATIONS

The First Office Action from corresponding Chinese Application No. 202080104228.9 dated Jun. 15, 2024. English translation attached.

Communication pursuant to Article 94(3) EPC for European application 20958094.3 mailed on Jun. 25, 2024.

The Second Office Action from corresponding Chinese Application No. 202080104228.9, dated Aug. 31, 2024. English translation attached.

Extended European Search Report dated Oct. 12, 2023 received in European Patent Application No. EP20958094.3.

NTT DOCOMO, Inc., "Summary on Email discussion [100b-e-NR-UEFeatures-NRU-04]," 3GPP Draft; R1-2002865, 3rd Generation Partnership Project (3GPP), Mobile Competence Centre; 650, Rout Des Lucioles; F-06921 Sophia-Antipolis Cedex; France; vol. RAN WG1, No. e-Meeting; Apr. 20, 2020-Apr. 30, 2020 May 1, 2020 (May 1, 2020), XP052342931, Retrieved from Internet: URL: https://ftp.3gpp.org/tsg_ran/WG1_RL1/TSGR1_100b_e/Docs/R1-2002865.ZIP, retrieved on May 1, 2020.

International Search Report and Written Opinion dated Jun. 16, 2021 in International Application No. PCT/CN2020/122526. English translation attached.

"3rd Generation Partnership Project;Technical Specification Group Radio Access Network;NR;Physical channels and modulation(Release 16)", 3GPP TS 38.211 V16.2.0, 2020-06.

"3rd Generation Partnership Project;Technical Specification Group Radio Access Network;NR;Multiplexing and channel coding(Release 16)", 3GPP TS 38.212 V16.2.0, Jun. 2020.

"3rd Generation Partnership Project;Technical Specification Group Radio Access Network;NR;Physical layer procedures for control(Release 16)", 3GPP TS 38.213 V16.2.0, Jun. 2020.

Communication pursuant to Article 94(3) EPC for European Application No. EP20958094.3 dated May 26, 2025.

Communication pursuant to Article 94(3) EPC for European Application No. EP20958094.3 dated Nov. 26, 2025.

* cited by examiner

100
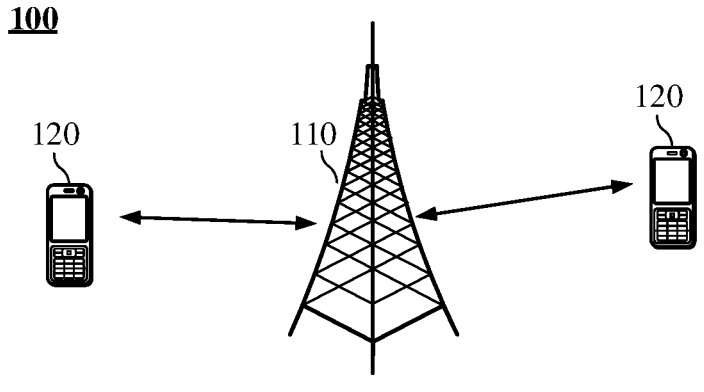
FIG. 1
Base Station
B
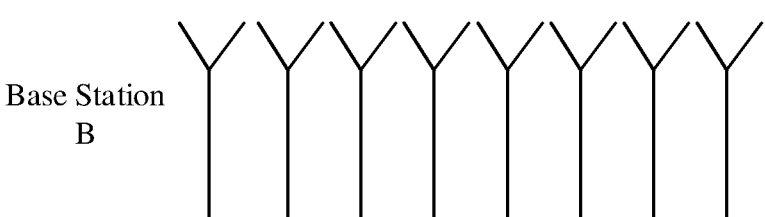
Terminal A
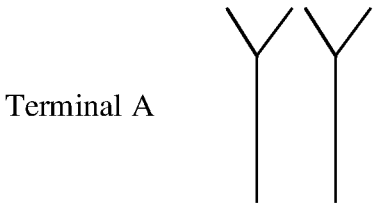
FIG. 2

200

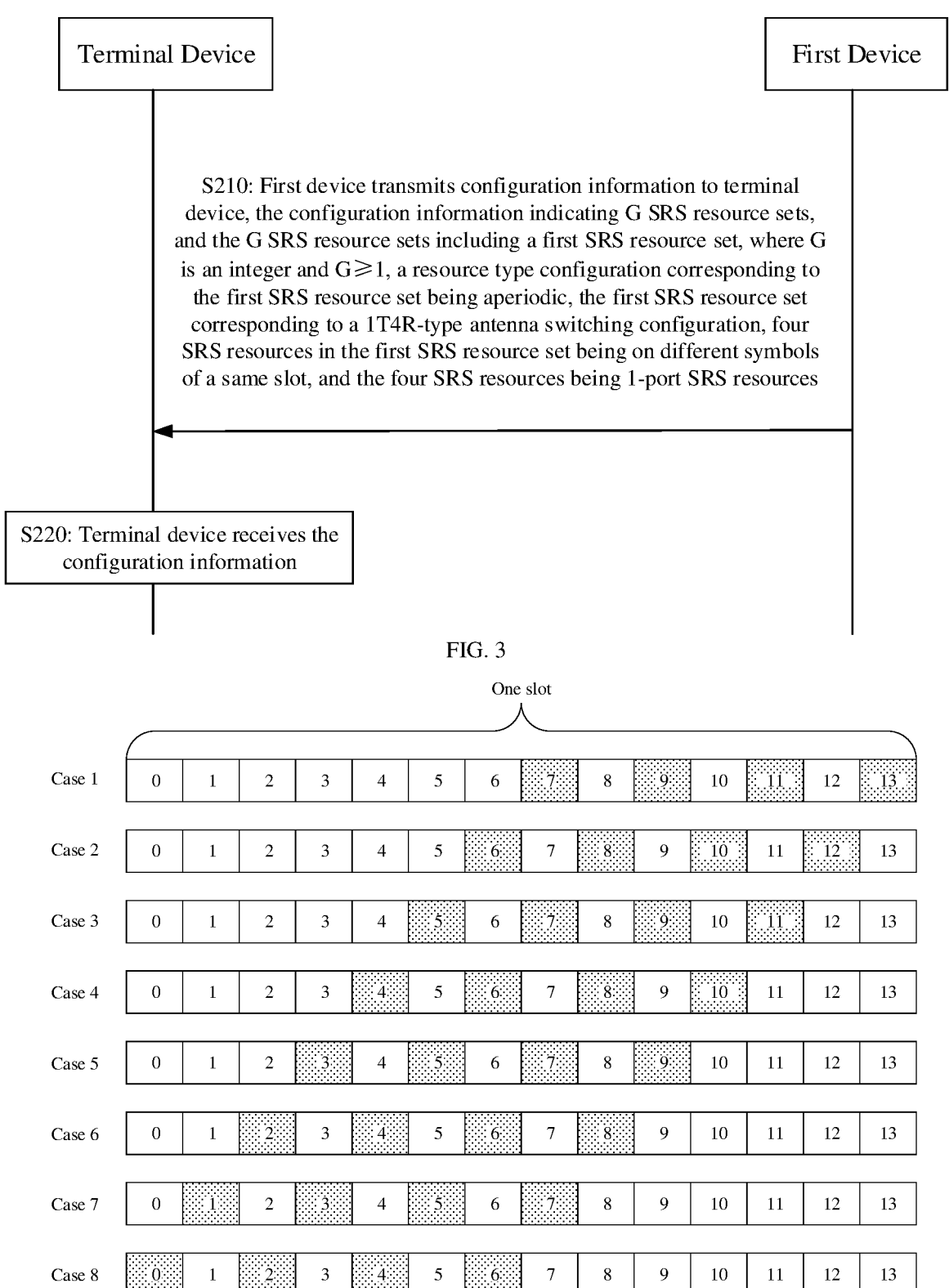

S210: First device transmits configuration information to terminal device, the configuration information indicating G SRS resource sets, and the G SRS resource sets including a first SRS resource set, where G is an integer and G≥1, a resource type configuration corresponding to the first SRS resource set being aperiodic, the first SRS resource set corresponding to a 1T4R-type antenna switching configuration, four SRS resources in the first SRS resource set being on different symbols of a same slot, and the four SRS resources being 1-port SRS resources S220: Terminal device receives the configuration information

WIRELESS COMMUNICATION METHOD AND DEVICE

CROSS-REFERENCE TO RELATED APPLICATIONS

This application is a continuation of International Application No. PCT/CN2020/122526 filed on Oct. 21, 2020, the entire disclosure of which is incorporated herein by reference.

TECHNICAL FIELD

The embodiments of the present disclosure relate to communication technology, and more particularly, to a wireless communication method and device.

BACKGROUND

In the New Radio (NR) system, for a 1T4R-type antenna switching, if the configured Sounding Reference Signal (SRS) resources are aperiodic, two SRS resource sets need to be configured. These two SRS resource sets have in total four 1-port SRS resources. These two SRS resource sets need to be in two different slots. In a sounding process corresponding to one 1T4R-type antenna switching, an SRS transmission needs to occupy 2 slots. That is, in order to complete the sounding process corresponding to one 1T4R-type antenna switching, the SRS transmission needs to occupy 2 slots, resulting in a long time for the sounding process, and thus the sounding performance will be degraded due to channel changes. Especially in the case of no continuous uplink slots, the time for one sounding process would be longer, and the impact of channel changes on the sounding performance would be more significant.

SUMMARY

The embodiments of the present disclosure provide a wireless communication method and device, capable of reducing a sounding delay and reducing an impact of channel changes on sounding performance.

In a first aspect, a wireless communication method is provided. The method includes:

receiving, by a terminal device, configuration information, the configuration information indicating G Sounding Reference Signal (SRS) resource sets, the G SRS resource sets including a first SRS resource set, where G is an integer and G≥1.

A resource type configuration corresponding to the first SRS resource set is aperiodic, the first SRS resource set corresponds to a 1T4R-type antenna switching configuration, four SRS resources in the first SRS resource set are on different symbols of a same slot, and the four SRS resources are 1-port SRS resources.

In a second aspect, a wireless communication method is provided. The method includes:

transmitting configuration information to a terminal device, the configuration information indicating G Sounding Reference Signal (SRS) resource sets, the G SRS resource sets including a first SRS resource set, where G is an integer and G≥1.

A resource type configuration corresponding to the first SRS resource set is aperiodic, the first SRS resource set corresponds to a 1T4R-type antenna switching configuration, four SRS resources in the first SRS resource set are on different symbols of a same slot, and the four SRS resources are 1-port SRS resources.

In a third aspect, a wireless communication device is provided. The wireless communication device is configured to perform the method according to the above first aspect.

In particular, the device includes one or more functional modules configured to perform the method according to the above first aspect.

In a fourth aspect, a wireless communication device is provided. The wireless communication device is configured to perform the method according to the above second aspect.

In particular, the device includes one or more functional modules configured to perform the method according to the above second aspect.

In a fifth aspect, a wireless communication device is provided. The wireless communication device includes a processor and a memory. The memory has a computer program stored thereon, and the processor is configured to invoke and execute the computer program stored in the memory to perform the method according to the above first aspect.

In a sixth aspect, a wireless communication device is provided. The wireless communication device includes a processor and a memory. The memory has a computer program stored thereon, and the processor is configured to invoke and execute the computer program stored in the memory to perform the method according to the above second aspect.

In a seventh aspect, an apparatus is provided. The apparatus is configured to perform the method according to any of the above first to second aspects.

In particular, the apparatus includes a processor configured to invoke and execute a computer program from a memory, to cause a device provided with the apparatus to perform the method according to any of the above first to second aspects.

In an eighth aspect, a computer-readable storage medium is provided. The computer-readable storage medium stores a computer program that causes a computer to perform the method according to any of the above first to second aspects.

In a ninth aspect, a computer program product is provided. The computer program product includes computer program instructions that cause a computer to perform the method according to any of the above first to second aspects.

In a tenth aspect, a computer program is provided. The computer program, when executed on a computer, causes the computer to perform the method according to any of the above first to second aspects.

With the above technical solutions, since the four SRS resources in the first SRS resource set are on different symbols in the same slot, that is, the terminal device can complete the aperiodic sounding process corresponding to the 1T4R-type antenna switching within one slot based on the four SRS resources in the first SRS resource set, thereby reducing the sounding delay.

BRIEF DESCRIPTION OF DRAWINGS

FIG. 1 is a schematic diagram showing an architecture of a communication system in which an embodiment of the present disclosure is applied.

FIG. 2 is a schematic diagram showing antennas at a terminal and antennas at a base station according to the present disclosure.

FIG. 3 is a flowchart illustrating a wireless communication method according to an embodiment of the present disclosure.

FIG. 4 is a schematic diagram showing a first SRS resource set when Y=1 according to an embodiment of the present disclosure.

DESCRIPTION OF EMBODIMENTS

Figure 5:
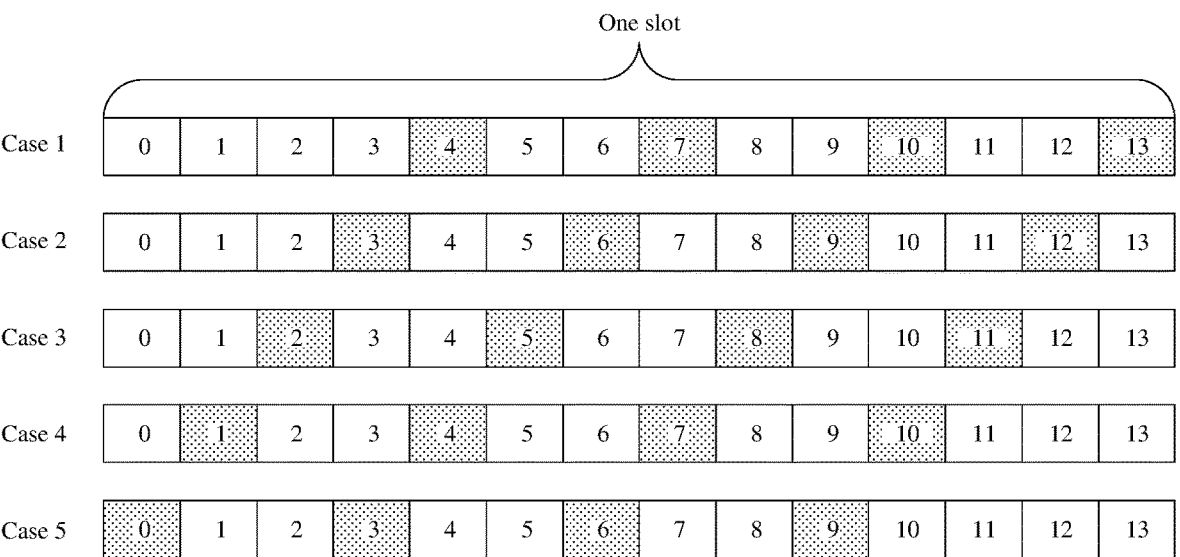
FIG. 5 is a schematic diagram showing a first SRS resource set when Y=2 according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 shows a communication system in which an embodiment of the present disclosure can be applied. A shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In order to better understand the embodiments of the present disclosure, the Multiple-Input Multiple-Output (MIMO) transmission related to the present disclosure will be described.

MIMO has been widely used in wireless communication systems, such as 3G, 4G (LTE), 5G (NR), and WiFi.

With the MIMO technology, a number of forms of gains can be obtained:

spatial diversity gain, beamforming gain (precoding gain), and spatial multiplexing gain.

In order to obtain the beamforming gain (also referred to as precoding gain) or spatial multiplexing gain, a transmitter needs to determine a beamforming matrix (or precoding matrix) for signal transmission. For the sake of simplicity of description, the terms "precoding" and "beamforming" will be used interchangeably hereinafter, i.e., when either of the terms is used, the description can be applied to "precoding" or "beamforming".

The determination of the precoding matrix often needs to be based on the corresponding transmission channel information. Optionally, on this basis, the determination of the precoding matrix may also be based on channel information, interference information, and the like corresponding to paired users in multi-user MIMO. Therefore, for determining the precoding matrix of Terminal A, a basic requirement is to obtain some form of channel information of the transmission channel corresponding to Terminal A.

In a practical system, in order to obtain the channel information of the transmission channel corresponding to Terminal A, there are two types of methods:

1. Feedback method: Base Station B transmits reference information X (such as Channel State Information Reference Signal (CSI-RS) signal), Terminal A measures and obtains information of the corresponding downlink channel according to the reference signal X, and then determines the corresponding channel feedback information, which may include some (e.g., part or all) of the following forms. Base Station B determines a corresponding precoding matrix according to the information fed back by Terminal A, for transmission of Physical Downlink Shared Channel (PDSCH) or Physical Downlink Control Channel (PDCCH) or other downlink channels or downlink reference signals to Terminal A, for example, Rank Indication (RI) (i.e., rank information, corresponding to the number of transmission streams suggested by the terminal), Channel Quality Indicator (CQI) (i.e., Modulation and Coding Scheme (MCS) related information), or Precoding Matrix Indicator (PMI) (i.e., codebook information).

2. Method based on channel reciprocity: Terminal A transmits SRS information according to configuration information from Base Station B, and Base Station B measures the corresponding uplink channel according to the received SRS information. According to the reciprocity between the uplink and downlink channels, Base Station B can determine a precoding matrix corresponding to Terminal A, for transmission of PDSCH or PDCCH or other downlink channels or downlink reference signals.

The above feedback method can be used in Time Division Duplex (TDD) systems and Frequency Division Duplex (FDD) systems; and the method based on channel reciprocity can mainly be used in TDD systems, and can also be used in FDD systems with partial reciprocity (not limited in protocols).

To facilitate better understanding of the embodiments of the present disclosure, antenna switching related to the present disclosure will be described.

From the above introduction to MIMO transmission, it can be seen that the method based on the channel reciprocity requires Terminal A to transmit an SRS signal. In NR, the configuration of the SRS resource set corresponding to such SRS signal is as follows:

The usage (usage) in the SRS resource set (SRS-ResourceSet) is set to "antenna switching (antennaSwitching)", and one SRS resource set (SRS-ResourceSet) contains one or more SRS resources.

The sounding process of this type of SRS signal is also referred to as a UE sounding procedure for Downlink DL Channel State Information (CSI) acquisition), or SRS transmission (Tx) port switching).

For a typical smart phone, the number of receiving antennas is typically greater than the number of transmitting antennas. For example, as shown in FIG. 2, Terminal A has two receiving antennas, but only one transmitting antenna (at a time). Therefore, if Terminal A transmits an SRS (for a single antenna, corresponding to an SRS resource of 1 SRS port), Base Station B can only obtain 8*1 channels, that is, the channel information corresponding to half of the channels is unknown, which will affect the precoding performance.

In order to solve the above problem, the network can configure two 1-port SRS resources, and the two SRS resources are transmitted from two antennas at different times. For example, at time T0, an SRS signal corresponding to SRS Resource 0 is transmitted from Antenna 0, and at time T1, an SRS signal corresponding to SRS Resource 1 is transmitted from Antenna 1. In this way, Base Station B can obtain 8*2 channel information from two SRS transmissions. The above two SRS resources will be configured in a same SRS resource set, and the corresponding usage will also be set to "antennaSwitching".

For Terminal A, the number of transmitting antennas, the number of receiving antennas, and whether it supports "antennaSwitching" (or equivalently, whether it supports SRS Tx port switching) can have different implementations, and can be reported via UE capability. Currently, the UE capability report corresponding to Release15 (Rel-15) NR is as follows: t1r2, t1r4, t2r4, t1r4-t2r4, t1r1, t2r2, t4r4, and notSupported. Here, t1r2 corresponds to 1T2R, t2r4 corresponds to 2T4R, t1r4 corresponds to 1T4R, t1r4-t2r4 corresponds to 1T4R or 2T4R, t1r1 corresponds to 1T=1R, t2r2 corresponds to 2T=2R, and t4r4 corresponds to 4T=4R.

For 1T2R: 0, 1, or 2 SRS resource sets can be configured, and the resource types (resourceType) corresponding to the two resource sets can be configured as different values, and the values can be aperiodic, semiPersistent, or periodic. In the following, when two SRS resource sets are configured, it would be similar and details thereof will be omitted. Each resource set contains two 1-port SRS resources. These two SRS resources are transmitted from different symbols, and the two SRS resources in a same resource set correspond to different UE antenna ports.

For 2T4R: 0, 1 or 2 SRS resource sets can be configured. Each resource set contains 2 SRS resources, each SRS resource is 2 SRS ports, the two SRS resources are transmitted from different symbols, and the UE antenna port pair corresponding to the SRS port pair of the second SRS resource in the same resource set is different from that corresponding to the SRS port pair of the first SRS resource.

For 1T4R: 0 or 1 SRS resource set can be configured (periodic or semi-persistent). Each resource set contains 4 1-port SRS resources, each SRS resource is transmitted from a different symbol, and different SRS resources correspond to different UE antenna ports.

For 1T4R: 0 or 2 SRS resource sets can be configured (both configured as aperiodic). In total 4 1-port SRS resources in the two resource sets are transmitted from different symbols of two different slots. The four SRS resources correspond to different UE antenna ports. For the 4 SRS resources, each resource set may contain 2 SRS resources, or one resource set may contain 3 SRS resources, and the other resource set may contain 1 SRS resource. The Radio Resource Control (RRC) configured power parameters corresponding to the two resource sets are the same, and the higher-layer parameters of aperiodic SRS resource trigger condition (aperiodicSRS-ResourceTrigger) are the same, but the parameters of slot offset (slotOffset) are different.

For 1T=1R, or 2T=2R, or 4T=4R: 0, 1 or 2 SRS resource sets can be configured, each resource set contains 1 SRS resource, and the SRS ports corresponding to the SRS resources are 1, 2, or 4, respectively.

If the terminal device reports support for "t1r4-t2r4", SRS resources in all the SRS resource sets must be configured with the same SRS port (1 or 2 SRS port).

It should be noted that to describe different antenna switching configurations, "xTyR" (the xTyR notation is typically used in physical layer protocols, and if x and y are equal, it is often expressed as xT=yR), or "txry" (the txry notation is typically used in UE capability signaling in higher-layer protocols) is typically used, where x and y represent positive integers greater than 0. These two notations correspond to each other, or are equivalent. In order to simplify the identification, in the embodiments of the present disclosure, only xTyR is used to represent the corresponding antenna switching, and when x=y, it is expressed as xT=yR.

To facilitate better understanding of the embodiments of the present disclosure, the antenna switching interval related to the present disclosure will be described.

In antenna switching, switching time is required. That is, the interval between SRS resources in the same resource set that are transmitted in the same slot is Y symbols, where the value of Y is shown in Table 1 below.

TABLE 1

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |

Here, different $\mu$ corresponds to different Subcarrier Spacings (SCSs), and $\Delta f$ is the subcarrier spacing (in kHz).

For the 1T4R-type antenna switching, if the configured SRS resources are aperiodic, two SRS resource sets need to be configured, and the two resource sets need to be transmitted on different slots. That is, in order to complete the sounding process corresponding to a 1T4R type antenna switching, the SRS transmission needs to occupy 2 slots, resulting in a long time for the sounding process, and thus the sounding performance will be degraded due to channel changes. Especially in the case of no continuous uplink slots, the time for one sounding process would be longer, and the impact of channel changes on the sounding performance would be more significant.

Based on the above problems, the present disclosure provides a wireless communication solution, capable of completing an aperiodic sounding process corresponding to a 1T4R-type antenna switching within one slot, thereby reducing the sounding delay.

The technical solutions of the present disclosure will be described in detail below with reference to specific embodiments.

FIG. 3 is a schematic flowchart illustrating a wireless communication method 200 according to an embodiment of the present disclosure. As shown in FIG. 3, the method 200 may include at least part of the following content.

At S210, a first device transmits configuration information to a terminal device. The configuration information indicates G SRS resource sets, and the G SRS resource sets include a first SRS resource set, where G is an integer and G≥1. A resource type configuration corresponding to the first SRS resource set is aperiodic, the first SRS resource set corresponds to a 1T4R-type antenna switching configuration, four SRS resources in the first SRS resource set are on different symbols of a same slot, and the four SRS resources are 1-port SRS resources.

At S220, the terminal device receives the configuration information.

In the embodiment of the present disclosure, since the four SRS resources in the first SRS resource set are on different symbols in the same slot, that is, the terminal device can complete the aperiodic sounding process corresponding to the 1T4R-type antenna switching within one slot based on the four SRS resources in the first SRS resource set, thereby reducing the sounding delay.

Optionally, the first device may be a network device. The above S210 may specifically be: the network device transmitting RRC signaling carrying the configuration information to the terminal device. Thus, the communication between the terminal and the network can be supported.

Optionally, the first device may be another terminal device which, for example, communicates with the terminal device by means of D2D communication, or communicates with the terminal device by means V2X, or communicates with the terminal device via a sidelink. The above S210 may specifically be: the other terminal device transmitting PC5-RRC signaling carrying the configuration information to the terminal device. Thus, communication between the terminals can be supported.

Optionally, the configuration information may be for an aperiodic sounding process corresponding to one 1T4R-type antenna switching, that is, the G SRS resource sets only include one first SRS resource set. The configuration information may alternatively be an aperiodic sounding process corresponding to a plurality of 1T4R-type antenna switchings, that is, the G SRS resource sets include a plurality of first SRS resource sets.

In the embodiment of the present disclosure, the usage field or field in the RRC Information element (IE) corresponding to each of the G SRS resource sets is set to antenna switching (antennaSwitching).

In addition, the resource type (resourceType) in the resource set (SRS-ResourceSet) corresponding to each of the G SRS resource sets can be configured as one of the following: aperiodic, semi-persistent, or periodic (different resource sets can be configured with different values of resourceType).

For example, the value of resourceType may be aperiodic. In another example, the value of resourceType may be semi-persistent. In another example, the value of resource-Type may be periodic.

Optionally, the SRS ports of the four SRS resources in the first SRS resource set may correspond to different UE antenna ports.

Optionally, in some embodiments, an interval between adjacent SRS resources among the 4 SRS resources in the first SRS resource set is equal to Y symbols, where Y is an integer and Y≥1. Specifically, the symbols in the interval between the four SRS resources are not used for signal transmission. That is, the terminal device does not transmit signals on the symbols in the interval between the four SRS resources. Correspondingly, the network device does not expect the terminal device to transmit signals on the symbols in the interval between the 4 SRS resources.

Optionally, in some other embodiments, the interval between adjacent SRS resources among the 4 SRS resources in the first SRS resource set is greater than or equal to Y symbols, where Y is an integer and Y≥1. That is, the interval between adjacent SRS resources may be greater than Y symbols, thereby increasing the flexibility in configuring the SRS resources. Specifically, the symbols in the interval between the four SRS resources are not used for signal transmission. That is, the terminal device does not transmit signals on the symbols in the interval between the four SRS resources. Correspondingly, the network device does not expect the terminal device to transmit signals on the symbols in the interval between the 4 SRS resources.

Optionally, in some embodiments, the 4 SRS resources in the first SRS resource set may not occupy the first Y symbols of one slot, where Y is an integer and Y≥1. It can guarantee certain switching time relative to the SRS transmitted in the previous slot, thereby reducing the implementation complexity of the terminal.

Optionally, Y may be for a part of P subcarrier spacings, each subcarrier spacing in the part of the P subcarrier spacings corresponding to a Y value, where P is an integer and P≥4. Optionally, the rest of the P subcarrier spacings may be determined by reporting UE capability information. It can be determined according to the different capabilities of terminals. On one hand, it can reduce the guard period for terminals with high capabilities, thereby reducing system overhead, and on the other hand, it can reduce the implementation complexity and cost of terminals with low capabilities, thereby facilitating promotion of the terminals with low capabilities.

Optionally, the part of the P subcarrier spacings may include the following four types:

15 kHz, 30 kHz, 60 kHz, and 120 kHz.

Here, the subcarrier spacing of 15 kHz corresponds to Y=1, the subcarrier spacing of 30 kHz corresponds to Y=1, the subcarrier spacing of 60 kHz corresponds to Y=1, and the subcarrier spacing of 120 kHz corresponds to Y=2. There may also be other correspondences between subcarrier spacings and Y, and the present disclosure is not limited to this.

In addition, the part of the P subcarrier spacings may include at least one of the following subcarrier spacings:

15 kHz, 30 kHz, 60 kHz, or 120 kHz.

Optionally, the P subcarrier spacings may include some or all of:

15 kHz, 30 kHz, 60 kHz, 120 kHz, 240 kHz, 480 kHz, 960 kHz, or 1920 kHz.

Optionally, Y may be pre-configured or agreed in a protocol. A subcarrier spacing of 15 kHz corresponds to Y=1, a subcarrier spacing of 30 kHz corresponds to Y=1, a subcarrier spacing of 60 kHz corresponds to Y=1, and a subcarrier spacing of 120 kHz corresponds to Y=2. There may also be other correspondences between subcarrier spacings and Y, and the present disclosure is not limited to this.

Optionally, Y may be determined according to a subcarrier spacing. For example, for a subcarrier spacing of 15 kHz, Y=1; for a subcarrier spacing of 30 kHz, Y=1; for a subcarrier spacing of 60 kHz, Y=1; and for a subcarrier spacing of 120 kHz, Y=2. There may also be other correspondences between subcarrier spacings and Y, and the present disclosure is not limited to this.

Optionally, in some embodiments, the G SRS resource sets may include at least one second SRS resource set, the second SRS resource set corresponds to a xTyR-type antenna switching configuration, and xTyR is different from 1T4R. Therefore, the same terminal device can be configured with SRSs for different types of antenna switching, such that a network device or another terminal device can flexibly support different types of antenna switching, thereby achieving improved resource utilization and reduced power consumption of the terminal.

Optionally, the xTyR may be one of:

1T1R, 1T2R, 1T6R, 1T8R, 2T4R, 2T8R, 4T6R, or 4T8R.

In addition, in some implementations, xTyR and 1T4R may be the same, that is, the second SRS resource set may correspond to a 1T4R-type antenna switching configuration.

Optionally, in some implementations, a resource type configuration corresponding to the second SRS resource set and a resource type configuration corresponding to the first SRS resource set may have different values. Therefore, the network device can use periodic resource sets (such as 1T1R) for transmission to obtain part of downlink channel information, which can ensure basic transmission and reduce SRS resource overhead. When downlink data transmission increases, 1T4R can be dynamically triggered to obtain more downlink channel information, thereby improving downlink transmission performance.

For example, the resource type configuration corresponding to the second SRS resource set may have a value of semi-persistent, and the resource type configuration corresponding to the first SRS resource set may have a value of aperiodic.

Optionally, in other implementations, a resource type configuration corresponding to the second SRS resource set and a resource type configuration corresponding to the first SRS resource set may have a same value. For example, the resource type configuration corresponding to the first SRS resource set may have a value of aperiodic, and the resource type configuration corresponding to the second SRS resource set may also have a value of aperiodic. That is, they are both aperiodic SRS resource sets, such that the network device or the other terminal device may have maximum flexibility in triggering SRS transmissions.

Optionally, in some implementations, an SRS transmission corresponding to the second SRS resource set and an SRS transmission corresponding to the first SRS resource set may not be in a same time unit.

Optionally, the time unit may include, but not limited to, at least one of:

slot or symbol.

For example, the SRS transmission corresponding to the second SRS resource set and the SRS transmission corresponding to the first SRS resource set cannot be in the same slot. Therefore, the SRS resources can be saved, and the complexity of configuring and triggering and scheduling the SRS process can also be reduced.

In another example, the SRS transmission corresponding to the second SRS resource set and the SRS transmission corresponding to the first SRS resource set cannot be on the same symbol. Therefore, the processing complexity of the terminal can be reduced, and the receiving complexity of the receiver can also be reduced.

Optionally, in other implementations, when an SRS transmission corresponding to the second SRS resource set and an SRS transmission corresponding to the first SRS resource set are in a same time unit, a transmission priority of an SRS to be transmitted may be determined based on a resource type configuration corresponding to the first SRS resource set and a resource type configuration corresponding to the second SRS resource set, and the terminal device may not transmit one of the SRS transmission corresponding to the first SRS resource set and the SRS transmission corresponding to the second SRS resource set that has a lower priority.

That is, when the SRS transmission corresponding to the second SRS resource set and the SRS transmission corresponding to the first SRS resource set are in the same time unit, the terminal device may determine the priorities of the SRS transmissions based on the resource type configuration corresponding to the first SRS resource set and the resource type configuration corresponding to the second SRS resource set.

Optionally, the SRS transmission priority corresponding to the resource type configuration may include:

aperiodic SRS transmission has a higher priority than periodic SRS transmission;

aperiodic SRS transmission has a higher priority than semi-persistent SRS transmission; and/or, semi-persistent SRS transmission has a higher priority than periodic SRS transmission.

It is assumed that the SRS transmission corresponding to the second SRS resource set and the SRS transmission corresponding to the first SRS resource set are in the same time unit. For example, if the resource type configuration corresponding to the first SRS resource set is aperiodic, and the resource type configuration corresponding to the second SRS resource set is periodic, then the terminal device can transmit the SRS transmission corresponding to the first SRS resource set, and not transmit the SRS transmission corresponding to the second SRS resource set. In another example, if the resource type configuration corresponding to the first SRS resource set is aperiodic, and the resource type configuration corresponding to the second SRS resource set is semi-persistent, then the terminal device can transmit the SRS transmission corresponding to the first SRS resource set, and not transmit the SRS transmission corresponding to the second SRS resource set.

Optionally, in some implementations, an interval between an SRS resource transmission corresponding to the first SRS resource set and an SRS resource transmission corresponding to the second SRS resource set is greater than or equal to M symbols, where M is an integer and M≥1. Therefore, a certain switching time between the first SRS resource set and the second SRS resource set can be guaranteed, thereby reducing the implementation complexity of the terminal.

Optionally, M may be for a part of Q subcarrier spacings, each subcarrier spacing in the part of the Q subcarrier spacings corresponding to an M value, where Q is an integer and Q≥4. Optionally, the rest of the Q subcarrier spacings may be determined by reporting UE capability information. It can be determined according to the different capabilities of terminals. On one hand, it can reduce the guard period for terminals with high capabilities, thereby reducing system overhead, and on the other hand, it can reduce the implementation complexity and cost of terminals with low capabilities, thereby facilitating promotion of the terminals with low capabilities.

Optionally, the part of the Q subcarrier spacings may include the following four types:

15 kHz, 30 kHz, 60 kHz, and 120 kHz.

Here, a subcarrier spacing of 15 kHz corresponds to M=1, a subcarrier spacing of 30 kHz corresponds to M=1, a subcarrier spacing of 60 kHz corresponds to M=1, and a subcarrier spacing of 120 kHz corresponds to M=2. There may also be other correspondences between subcarrier spacings and M, and the embodiment of the present disclosure is not limited to this.

In addition, the part of the Q subcarrier spacings may also include at least one of the following subcarrier spacings:

15 kHz, 30 kHz, 60 kHz, or 120 kHz.

Optionally, the Q subcarrier spacings may include part or all of:

15 kHz, 30 kHz, 60 kHz, 120 kHz, 240 kHz, 480 kHz, 960 kHz, or 1920 kHz.

Optionally, M may be pre-configured or agreed in a protocol. A subcarrier spacing of 15 kHz corresponds to M=1, a subcarrier spacing of 30 kHz corresponds to M=1, a subcarrier spacing of 60 kHz corresponds to M=1, and a subcarrier spacing of 120 kHz corresponds to M=2. There may also be other correspondences between subcarrier spacings and M, and the embodiment of the present disclosure is not limited to this.

Optionally, M may be determined according to a subcarrier spacing. For example, for a subcarrier spacing of 15 kHz, M=1; for a subcarrier spacing of 30 kHz, M=1; for a subcarrier spacing of 60 kHz, M=1; and for a subcarrier spacing of 120 kHz, M=2. There may also be other correspondences between subcarrier spacings and M, and the embodiment of the present disclosure is not limited to this.

Optionally, in some embodiments, the terminal device may transmit first terminal capability information to the first device. The first terminal capability information indicates that the terminal device supports 1T4R-type antenna switching. Further, the first device may determine the configuration information according to the first terminal capability information.

That is, before receiving the configuration information, the terminal device may transmit the first terminal capability information.

Optionally, the first terminal capability information may further indicate that the terminal device supports at least one of the following types of antenna switching:

1T2R-type antenna switching, 1T1R-type antenna switching, 2T4R-type antenna switching, 1T6R-type antenna switching, 1T8R-type antenna switching, 2T8R-type antenna switching, 4T6R-type antenna switching, or 4T8R-type antenna switching.

Thus, terminals having more capabilities can be supported.

Optionally, in some embodiments, the terminal device may transmit second terminal capability information to the first device, the second terminal capability information indicating that the terminal device supports SRS transmission on any symbol of a slot. Further, the first device may determine the configuration information according to the second terminal capability information.

Optionally, in some embodiments, the terminal device may transmit second terminal capability information to the first device, the second terminal capability information indicating that the terminal device supports, in addition to SRS transmission on the last 6 symbols of a slot, SRS transmission on symbols other than the 6 symbols in the slot. For example, the second terminal capability information may indicate that the terminal device supports SRS transmission on the last K symbols of a slot (where K>6). Further, the first device may determine the configuration information according to the second terminal capability information. For example, K=8.

That is, before receiving the configuration information, the terminal device may transmit the second terminal capability information.

Optionally, the second terminal capability information may be for non-shared spectrum channel access. Therefore, it can be extended to scenarios other than shared spectrum channel access.

Optionally, the second terminal capability information may be for licensed spectrum channel access. Therefore, it can be extended to scenarios for licensed spectrum channel access.

The legacy terminal only supports SRS transmission on the last 6 symbols of a slot. With the second terminal capability information, the SRS resources corresponding to the 1T4R-type antenna switching configuration can be configured in one slot.

Optionally, in some embodiments, the terminal device may transmit third terminal capability information to the first device, the third terminal capability information indicating that the terminal device supports transmission of an aperiodic SRS configuration corresponding to the 1T4R type within one slot. Further, the first device may determine the configuration information according to the third terminal capability information.

That is, before receiving the configuration information, the terminal device may transmit the third terminal capability information.

Optionally, in an embodiment of the present disclosure, SRS ports of different SRS resources in a same SRS resource set correspond to different terminal antenna ports.

Optionally, in an embodiment of the present disclosure, a part or all of SRS resources in each of the G SRS resource sets may correspond to one of the following subcarrier spacings:

15 kHz, 30 kHz, 60 kHz, 120 kHz, 240 kHz, 480 kHz, 960 kHz, or 1920 kHz.

Optionally, in an embodiment of the present disclosure, the terminal device may transmit an SRS signal according to the configuration information.

Correspondingly, the first device may receive the SRS signal transmitted by the terminal device according to the configuration information; determine precoding corresponding to the terminal device according to a measurement result of the received SRS signal; and transmit a channel and/or a signal to the terminal device according to the precoding. When the first device is a network device, the channel may be PDSCH or PDCCH, or another downlink channel. When the first device is another terminal device, the channel may be a Physical Sidelink Control Channel (PSCCH), a Physical Sidelink Shared Channel (PSSCH), or another sidelink channel.

The possible positions of the four 1-port SRS resources in the first SRS resource set in one slot according to the embodiment of the present disclosure will be described below with reference to Embodiment 1 and Embodiment 2, respectively.

In Embodiment 1, when Y=1 (15 kHz, 30 kHz, 60 kHz) and the interval between adjacent SRS resources is Y, the possible positions of the four 1-port SRS resources in the first SRS resource set in one slot may be the 8 cases shown in FIG. 4. It should be noted that the 4 SRS resources in the first SRS resource set may occupy the first symbol of a slot, as shown in Case 8, that is, the 4 SRS resources in the first SRS resource set may alternatively occupy the first Y symbols of a slot.

In Embodiment 2, when Y=2 (120 kHz), and the interval between adjacent SRS resources is Y, the possible positions of the four 1-port SRS resources in the first SRS resource set in one slot can be the 5 cases shown in FIG. 5. It should be noted that the 4 SRS resources in the first SRS resource set may occupy the first symbol of a slot, as shown in Case 5, that is, the 4 SRS resources in the first SRS resource set may alternatively occupy the first Y symbols of a slot.

Therefore, in the embodiment of the present disclosure, since the four SRS resources in the first SRS resource set are on different symbols in the same slot, that is, the terminal device can complete the aperiodic sounding process corresponding to the 1T4R-type antenna switching within one slot based on the four SRS resources in the first SRS resource set, thereby reducing the sounding delay.

The method embodiments of the present disclosure have been described in detail above with reference to FIGS. 3-5, and the apparatus embodiments of the present disclosure will be described in detail below with reference to FIGS. 6-10. It can be appreciated that the apparatus embodiments and the method embodiments correspond to each other, and for similar descriptions, reference can be made to the method embodiments.

Figure 6:
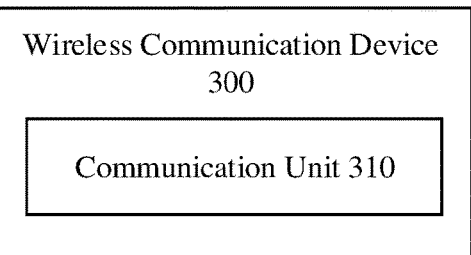
FIG. 6 is a schematic block diagram of a wireless communication device according to an embodiment of the present disclosure.

FIG. 6 shows a schematic block diagram of a wireless communication device 300 according to an embodiment of the present disclosure. As shown in FIG. 6, the wireless communication device 300 includes:

a communication unit 310 configured to receive configuration information, the configuration information indicating G Sounding Reference Signal (SRS) resource sets, the G SRS resource sets including a first SRS resource set, where G is an integer and G≥1.

A resource type configuration corresponding to the first SRS resource set is aperiodic, the first SRS resource set corresponds to a 1T4R-type antenna switching configuration, four SRS resources in the first SRS resource set are on different symbols of a same slot, and the four SRS resources are 1-port SRS resources.

Optionally, an interval between adjacent SRS resources among the 4 SRS resources is equal to Y symbols, where Y is an integer and Y≥1.

Optionally, the symbols in the interval between the four SRS resources may not be used for signal transmission.

Optionally, the four SRS resources may not occupy the first Y symbols of the slot, where Y is an integer and Y≥1.

Optionally, Y may be for a part of P subcarrier spacings, each subcarrier spacing in the part of the P subcarrier spacings corresponding to a Y value, where P is an integer and P≥4.

Optionally, the part of the P subcarrier spacings may include the following four types:

15 kHz, 30 kHz, 60 kHz, and 120 kHz.

15 kHz corresponds to Y=1, 30 kHz corresponds to Y=1, 60 kHz corresponds to Y=1, and 120 kHz corresponds to Y=2.

Optionally, Y may be pre-configured or agreed in a protocol. A subcarrier spacing of 15 kHz corresponds to Y=1, a subcarrier spacing of 30 kHz corresponds to Y=1, a subcarrier spacing of 60 kHz corresponds to Y=1, and a subcarrier spacing of 120 kHz corresponds to Y=2.

Alternatively, Y may be determined according to a subcarrier spacing.

Optionally, the G SRS resource sets may include at least one second SRS resource set, the second SRS resource set corresponding to a xTyR-type antenna switching configuration, and xTyR being different from 1T4R.

Optionally, a resource type configuration corresponding to the second SRS resource set and a resource type configuration corresponding to the first SRS resource set may have different values.

Optionally, a resource type configuration corresponding to the second SRS resource set and a resource type configuration corresponding to the first SRS resource set may have a same value.

Optionally, an SRS transmission corresponding to the second SRS resource set and an SRS transmission corresponding to the first SRS resource set may not be in a same time unit.

Optionally, when an SRS transmission corresponding to the second SRS resource set and an SRS transmission corresponding to the first SRS resource set are in a same time unit, a transmission priority of an SRS to be transmitted may be determined based on a resource type configuration corresponding to the first SRS resource set and a resource type configuration corresponding to the second SRS resource set, and the terminal device may not transmit one of the SRS transmission corresponding to the first SRS resource set and the SRS transmission corresponding to the second SRS resource set that has a lower priority.

Optionally, the SRS transmission priority corresponding to the resource type configuration may include:

aperiodic SRS transmission has a higher priority than periodic SRS transmission;

aperiodic SRS transmission has a higher priority than semi-persistent SRS transmission; and/or, semi-persistent SRS transmission has a higher priority than periodic SRS transmission.

Optionally, the time unit may include at least one of: slot or symbol.

Optionally, an interval between an SRS resource transmission corresponding to the first SRS resource set and an SRS resource transmission corresponding to the second SRS resource set may be greater than or equal to M symbols, where M is an integer and M≥1.

Optionally, M may be for a part of Q subcarrier spacings, each subcarrier spacing in the part of the Q subcarrier spacings corresponding to an M value, where Q is an integer and Q≥4.

Optionally, the part of the Q subcarrier spacings may include the following four types:

15 kHz, 30 kHz, 60 kHz, and 120 kHz.

15 kHz corresponds to M=1, 30 kHz corresponds to M=1, 60 kHz corresponds to M=1, and 120 kHz corresponds to M=2.

Optionally, M may be pre-configured or agreed in a protocol. A subcarrier spacing of 15 kHz corresponds to M=1, a subcarrier spacing of 30 kHz corresponds to M=1, a subcarrier spacing of 60 kHz corresponds to M=1, and a subcarrier spacing of 120 kHz corresponds to M=2.

Alternatively, M may be determined according to a subcarrier spacing.

Optionally, xTyR may be one of:

1T1R, 1T2R, 1T6R, 1T8R, 2T4R, 2T8R, 4T6R, or 4T8R.

Optionally, the communication unit 310 may be further configured to transmit first terminal capability information, the first terminal capability information indicating that the terminal device supports the 1T4R-type antenna switching.

Optionally, the first terminal capability information may further indicate that the terminal device supports at least one of the following types of antenna switching:

1T2R-type antenna switching, 1T1R-type antenna switching, 2T4R-type antenna switching, 1T6R-type antenna switching, 1T8R-type antenna switching, 2T8R-type antenna switching, 4T6R-type antenna switching, or 4T8R-type antenna switching.

Optionally, the communication unit 310 may be further configured to transmit second terminal capability information, the second terminal capability information indicating that the terminal device supports SRS transmission on any symbol of a slot.

Optionally, the second terminal capability information may be for non-shared spectrum channel access; or the second terminal capability information may be for licensed spectrum channel access.

Optionally, the communication unit may be further configured to transmit third terminal capability information, the third terminal capability information indicating that the terminal device supports transmission of an aperiodic SRS configuration corresponding to the 1T4R type within one slot.

Optionally, a part or all of SRS resources in each of the G SRS resource sets may correspond to one of the following subcarrier spacings:

15 kHz, 30 kHz, 60 kHz, 120 kHz, 240 kHz, 480 kHz, 960 kHz, or 1920 kHz.

Optionally, SRS ports of different SRS resources in a same SRS resource set may correspond to different terminal antenna ports.

Optionally, the communication unit 310 may be configured to:

receive the configuration information transmitted by a first device.

The first device may include at least one of:

a network device or another terminal device.

Optionally, the communication unit 310 may be further configured to transmit an SRS signal according to the configuration information.

Optionally, in some embodiments, the above communication unit may be a communication interface or a transceiver, or an input/output interface of a communication chip or a system-on-chip.

It can be appreciated that the wireless communication device 300 according to the embodiment of the present disclosure may correspond to the terminal device in the method embodiment of the present disclosure, and the above and other operations and/or functions of the respective units in the wireless communication device 300 are provided for the purpose of implementing the process flow corresponding to the terminal device in the method 200 shown in FIG. 3, and details thereof will be not omitted here for brevity.

Figure 7:
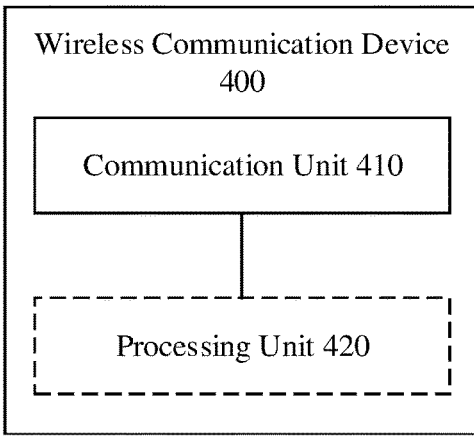
FIG. 7 is a schematic block diagram of a wireless communication device according to an embodiment of the present disclosure.

FIG. 7 shows a schematic block diagram of a wireless communication device 400 according to an embodiment of the present disclosure. As shown in FIG. 7, the wireless communication device 400 includes:

a communication unit 410 configured to transmit configuration information to a terminal device, the configuration information indicating G Sounding Reference Signal (SRS) resource sets, the G SRS resource sets including a first SRS resource set, where G is an integer and G≥1.

A resource type configuration corresponding to the first SRS resource set is aperiodic, the first SRS resource set corresponds to a 1T4R-type antenna switching configuration, the four SRS resources in the first SRS resource set are on different symbols of a same slot, and the four SRS resources are 1-port SRS resources.

Optionally, an interval between adjacent SRS resources among the 4 SRS resources is equal to Y symbols, where Y is an integer and Y≥1.

Optionally, the symbols in the interval between the four SRS resources may not be used for signal transmission.

Optionally, the four SRS resources may not occupy the first Y symbols of the slot, where Y is an integer and Y≥1.

Optionally, Y may be for a part of P subcarrier spacings, each subcarrier spacing in the part of the P subcarrier spacings corresponding to a Y value, where P is an integer and P≥4.

Optionally, the part of the P subcarrier spacings may include the following four types:

15 kHz, 30 kHz, 60 kHz, and 120 kHz.

15 kHz corresponds to Y=1, 30 kHz corresponds to Y=1, 60 kHz corresponds to Y=1, and 120 kHz corresponds to Y=2.

Optionally, Y may be pre-configured or agreed in a protocol. A subcarrier spacing of 15 kHz corresponds to Y=1, a subcarrier spacing of 30 kHz corresponds to Y=1, a subcarrier spacing of 60 kHz corresponds to Y=1, and a subcarrier spacing of 120 kHz corresponds to Y=2.

Alternatively, Y may be determined according to a subcarrier spacing.

Optionally, the G SRS resource sets may include at least one second SRS resource set, the second SRS resource set corresponding to a xTyR-type antenna switching configuration, and xTyR being different from 1T4R.

Optionally, a resource type configuration corresponding to the second SRS resource set and a resource type configuration corresponding to the first SRS resource set may have different values.

Optionally, a resource type configuration corresponding to the second SRS resource set and a resource type configuration corresponding to the first SRS resource set may have a same value.

Optionally, an SRS transmission corresponding to the second SRS resource set and an SRS transmission corresponding to the first SRS resource set may not be in a same time unit.

Optionally, when an SRS transmission corresponding to the second SRS resource set and an SRS transmission corresponding to the first SRS resource set may be in a same time unit, a transmission priority of an SRS to be transmitted may be determined based on a resource type configuration corresponding to the first SRS resource set and a resource type configuration corresponding to the second SRS resource set, and the terminal device may not transmit one of the SRS transmission corresponding to the first SRS resource set and the SRS transmission corresponding to the second SRS resource set that has a lower priority.

Optionally, the SRS transmission priority corresponding to the resource type configuration may include:

aperiodic SRS transmission has a higher priority than periodic SRS transmission;

aperiodic SRS transmission has a higher priority than semi-persistent SRS transmission; and/or, semi-persistent SRS transmission has a higher priority than periodic SRS transmission.

Optionally, the time unit may include at least one of: slot or symbol.

Optionally, an interval between an SRS resource transmission corresponding to the first SRS resource set and an SRS resource transmission corresponding to the second SRS resource set may be greater than or equal to M symbols, where M is an integer and M≥1.

Optionally, M may be for a part of Q subcarrier spacings, each subcarrier spacing in the part of the Q subcarrier spacings corresponding to an M value, where Q is an integer and Q≥4.

Optionally, the part of the Q subcarrier spacings may include the following four types:

15 kHz, 30 kHz, 60 kHz, and 120 kHz.

15 kHz corresponds to M=1, 30 kHz corresponds to M=1, 60 kHz corresponds to M=1, and 120 kHz corresponds to M=2.

Optionally, M may be pre-configured or agreed in a protocol. A subcarrier spacing of 15 kHz corresponds to M=1, a subcarrier spacing of 30 kHz corresponds to M=1, a subcarrier spacing of 60 kHz corresponds to M=1, and a subcarrier spacing of 120 kHz corresponds to M=2.

Alternatively, M may be determined according to a subcarrier spacing.

Optionally, xTyR may be one of:

1T1R, 1T2R, 1T6R, 1T8R, 2T4R, 2T8R, 4T6R, or 4T8R.

Optionally, the communication unit 410 may be further configured to receive first terminal capability information transmitted by the terminal device, the first terminal capability information indicating that the terminal device supports the 1T4R-type antenna switching.

Optionally, the first terminal capability information may further indicate that the terminal device supports at least one of the following types of antenna switching:

1T2R-type antenna switching, 1T1R-type antenna switching, 2T4R-type antenna switching, 1T6R-type antenna switching, 1T8R-type antenna switching, 2T8R-type antenna switching, 4T6R-type antenna switching, or 4T8R-type antenna switching.

Optionally, the communication unit 410 may be further configured to receive second terminal capability information transmitted by the terminal device, the second terminal capability information indicating that the terminal device supports SRS transmission on any symbol of a slot.

Optionally, the second terminal capability information may be for non-shared spectrum channel access; or the second terminal capability information may be for licensed spectrum channel access.

Optionally, the communication unit 410 may be further configured to receive third terminal capability information transmitted by the terminal device, the third terminal capability information indicating that the terminal device supports transmission of an aperiodic SRS configuration corresponding to the 1T4R type within one slot.

Optionally, a part or all of SRS resources in each of the G SRS resource sets may correspond to one of the following subcarrier spacings:

15 kHz, 30 kHz, 60 kHz, 120 kHz, 240 kHz, 480 kHz, 960 kHz, or 1920 kHz.

Optionally, SRS ports of different SRS resources in a same SRS resource set may correspond to different terminal antenna ports.

Optionally, the wireless communication device 400 may further include: a processing unit 420.

The communication unit 410 may be further configured to receive an SRS signal transmitted by the terminal device according to the configuration information;

the processing unit 420 may be configured to determine precoding corresponding to the terminal device according to a measurement result of the received SRS signal; and the communication unit 410 may be further configured to transmit a channel and/or a signal to the terminal device according to the precoding.

Optionally, a first device may transmit the configuration information to the terminal device.

The first device may include at least one of:

a network device or another terminal device.

Optionally, in some embodiments, the above communication unit may be a communication interface or a transceiver, or an input/output interface of a communication chip or a system-on-chip. The above processing unit may be one or more processors.

It can be appreciated that the wireless communication device 400 according to the embodiment of the present disclosure may correspond to the first device in the method embodiment of the present disclosure, and the above and other operations and/or functions of the respective units in the wireless communication device 400 are provided for the purpose of implementing the process flow corresponding to the first device in the method 200 shown in FIG. 3, and details thereof will be not omitted here for brevity.

Figure 8:
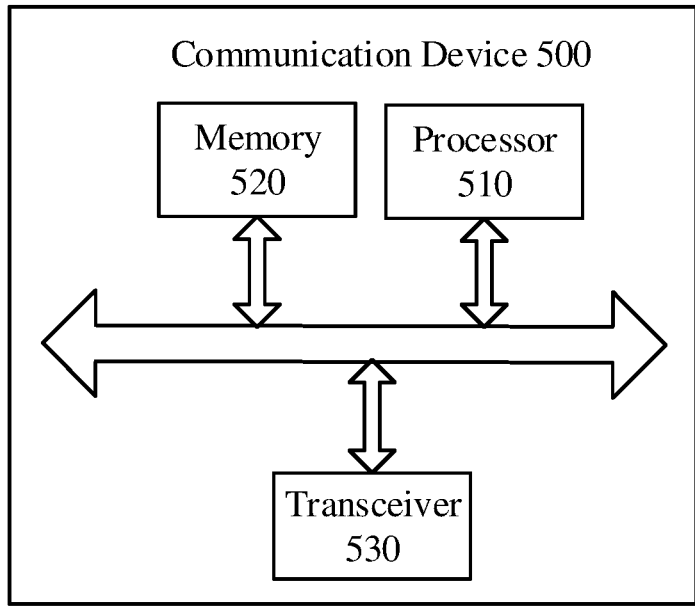
FIG. 8 is a schematic block diagram of a communication device according to another embodiment of the present disclosure.

FIG. 8 is a schematic diagram showing a structure of a communication device 500 according to an embodiment of the present disclosure. The communication device 500 shown in FIG. 8 includes a processor 510, and the processor 510 can invoke and execute a computer program from a memory to implement the method in the embodiment of the present disclosure.

Optionally, as shown in FIG. 8, the communication device 500 may further include a memory 520. The processor 510 can invoke and execute a computer program from the memory 520 to implement the method in the embodiment of the present disclosure.

The memory 520 may be a separate device independent from the processor 510, or may be integrated in the processor 510.

Optionally, as shown in FIG. 8, the communication device 500 may further include a transceiver 530, and the processor 510 may control the transceiver 530 to communicate with other devices, and in particular, transmit information or data to other devices, or receive information or data transmitted by other devices.

Here, the transceiver 530 may include a transmitter and a receiver. The transceiver 530 may further include one or more antennas.

Optionally, the communication device 500 may specifically be the first device according to the embodiment of the present disclosure, and the communication device 500 may implement the corresponding processes implemented by the first device in any of the methods according to the embodiments of the present disclosure. For the sake of brevity, details thereof will be omitted here.

Optionally, the communication device 500 may specifically be the terminal device according to the embodiment of the present disclosure, and the communication device 500 may implement the corresponding processes implemented by the terminal device in any of the methods according to the embodiments of the present disclosure. For the sake of brevity, details thereof will be omitted here.

Figure 9:
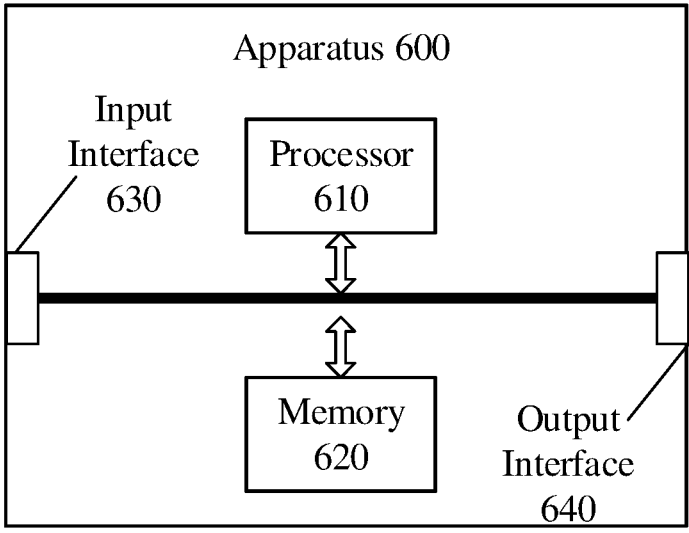
FIG. 9 is a schematic block diagram of an apparatus according to an embodiment of the present disclosure.

FIG. 9 is a schematic diagram showing a structure of an apparatus according to an embodiment of the present disclosure. The apparatus 600 shown in FIG. 9 includes a processor 610, and the processor 610 can invoke and execute a computer program from a memory to implement the method in the embodiment of the present disclosure.

Optionally, as shown in FIG. 9, the apparatus 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, the apparatus 600 may further include an input interface 630. The processor 610 can control the input interface 630 to communicate with other devices or chips, and in particular, obtain information or data transmitted by other devices or chips.

Optionally, the apparatus 600 may further include an output interface 640. The processor 610 can control the output interface 640 to communicate with other devices or chips, and in particular, output information or data to other devices or chips.

Optionally, the apparatus can be applied to the first device in the embodiment of the present disclosure, and the apparatus can implement the corresponding processes implemented by the first device in the various methods of the embodiments of the present disclosure. For the sake of brevity, details thereof will be omitted here.

Optionally, the apparatus can be applied to the terminal device in the embodiment of the present disclosure, and the apparatus can implement the corresponding processes implemented by the terminal device in the various methods of the embodiments of the present disclosure. For the sake of brevity, details thereof will be omitted here.

Optionally, the apparatus in the embodiment of the present disclosure may be a chip, e.g., system-level chip, a system-chip, a chip system, or a system-on-chip.

Figure 10:
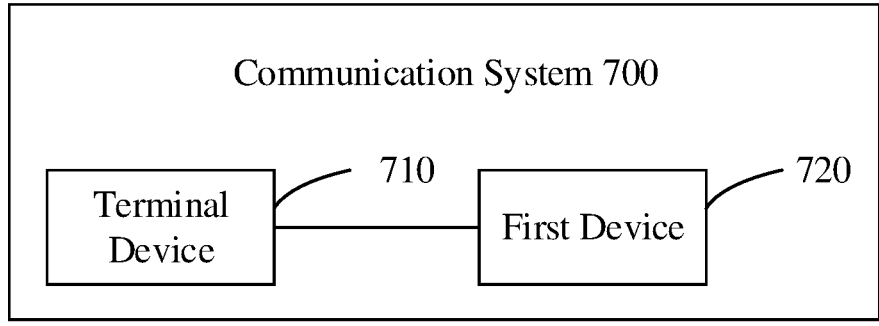
FIG. 10 is a schematic block diagram of a communication system according to an embodiment of the present disclosure.

FIG. 10 is a schematic block diagram showing a communication system 700 according to an embodiment of the present disclosure. As shown in FIG. 10, the communication system 700 includes a terminal device 710 and a first device 720.

Here, the terminal device 710 can be configured to implement the corresponding functions implemented by the terminal device in the above method, and the first device 720 can be configured to implement the corresponding functions implemented by the first device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the first device in the embodiment of the present disclosure, and the computer program can cause a computer to perform corresponding procedures implemented by the first device in the method according to any of the embodiments of the present disclosure. Details thereof will be omitted here for simplicity.

Optionally, the computer readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

Optionally, the computer program product can be applied to the first device in the embodiment of the present disclosure, and the computer program instructions can cause a computer to perform corresponding procedures implemented by the first device in the method according to any of the embodiments of the present disclosure. Details thereof will be omitted here for simplicity.

Optionally, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

Optionally, the computer program can be applied to the first device in the embodiment of the present disclosure. The computer program, when executed on a computer, can cause the computer to perform corresponding procedures implemented by the first device in the method according to any of the embodiments of the present disclosure. Details thereof will be omitted here for simplicity.

Optionally, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of the present disclosure as defined by the claims as attached.

What is claimed is:

1. A wireless communication method, comprising:

receiving, by a terminal device, configuration information, the configuration information indicating G Sounding Reference Signal (SRS) resource sets, the G SRS resource sets including a first SRS resource set, where G is an integer and G≥1, wherein a resource type configuration corresponding to the first SRS resource set is aperiodic, the first SRS resource set corresponds to a 1T4R-type antenna switching configuration, four SRS resources in the first SRS resource set are on different symbols of a same slot, and the four SRS resources are 1-port SRS resources, wherein the method further comprises:

transmitting, by the terminal device, second terminal capability information, the second terminal capability information indicating that the terminal device supports SRS transmission on last K symbols of a slot, where K is an integer greater than 6.

2. The method according to claim 1, wherein:

an interval between adjacent SRS resources among the 4 SRS resources is equal to Y symbols, where Y is an integer and Y≥1.

3. The method according to claim 2, wherein:

the symbols in the interval between the four SRS resources are not used for signal transmission.

4. The method according to claim 2, wherein

Y is for a part of P subcarrier spacings, each subcarrier spacing in the part of the P subcarrier spacings corresponding to a Y value, where P is an integer and P≥4.

5. The method according to claim 4, wherein the part of the P subcarrier spacings comprises the following four types:

15 kHz, 30 kHz, 60 kHz, and 120 kHz;

wherein 15 kHz corresponds to Y=1, 30 kHz corresponds to Y=1, 60 kHz corresponds to Y=1, and 120 kHz corresponds to Y=2.

6. The method according to claim 2, wherein

Y is pre-configured or agreed in a protocol, wherein a subcarrier spacing of 15 kHz corresponds to Y=1, a subcarrier spacing of 30 kHz corresponds to Y=1, a subcarrier spacing of 60 kHz corresponds to Y=1, and a subcarrier spacing of 120 kHz corresponds to Y=2; or Y is determined according to a subcarrier spacing.

7. The method according to claim 1, further comprising:

transmitting, by the terminal device, first terminal capability information, the first terminal capability information indicating that the terminal device supports the 1T4R-type antenna switching.

8. The method according to claim 7, wherein the first terminal capability information further indicates that the terminal device supports at least one of the following types of antenna switching:

1T2R-type antenna switching, 1T1R-type antenna switching, 2T4R-type antenna switching, 1T6R-type antenna switching, 1T8R-type antenna switching, 2T8R-type antenna switching, 4T6R-type antenna switching, or 4T8R-type antenna switching.

9. The method according to claim 1, wherein:

the second terminal capability information is for non-shared spectrum channel access; or the second terminal capability information is for licensed spectrum channel access.

10. The method according to claim 1, further comprising:

transmitting, by the terminal device, third terminal capability information, the third terminal capability information indicating that the terminal device supports transmission of an aperiodic SRS configuration corresponding to the 1T4R type within one slot.

11. The method according to claim 1, wherein a part or all of SRS resources in each of the G SRS resource sets correspond to one of the following subcarrier spacings:

15 kHz, 30 kHz, 60 kHz, 120 kHz, 240 kHz, 480 kHz, 960 kHz, or 1920 kHz.

12. The method according to claim 1, wherein

SRS ports of different SRS resources in a same SRS resource set correspond to different terminal antenna ports.

13. The method according to claim 1, wherein said receiving, by the terminal device, the configuration information comprises:

receiving, by the terminal device, the configuration information transmitted by a first device, wherein the first device comprises at least one of:

a network device or another terminal device.

14. The method according to claim 1, further comprising:

transmitting, by the terminal device, an SRS signal according to the configuration information.

15. A wireless communication device, comprising a processor and a memory, wherein the memory has a computer program stored thereon, and the processor is configured to invoke and execute the computer program stored in the memory to:

receive configuration information, the configuration information indicating G Sounding Reference Signal (SRS) resource sets, the G SRS resource sets including a first SRS resource set, where G is an integer and G≥1, wherein a resource type configuration corresponding to the first SRS resource set is aperiodic, the first SRS resource set corresponds to a 1T4R-type antenna switching configuration, four SRS resources in the first SRS resource set are on different symbols of a same slot, and the four SRS resources are 1-port SRS resources, wherein the processor is configured to invoke and execute the computer program stored in the memory to:

transmit second terminal capability information, the second terminal capability information indicating that the terminal device supports SRS transmission on last K symbols of a slot, where K is an integer greater than 6.

16. A wireless communication device, comprising a processor and a memory, wherein the memory has a computer program stored thereon, and the processor is configured to invoke and execute the computer program stored in the memory to:

transmit configuration information to a terminal device, the configuration information indicating G Sounding Reference Signal (SRS) resource sets, the G SRS resource sets including a first SRS resource set, where G is an integer and G≥1, wherein a resource type configuration corresponding to the first SRS resource set is aperiodic, the first SRS resource set corresponds to a 1T4R-type antenna switching configuration, four SRS resources in the first SRS resource set are on different symbols of a same slot, and the four SRS resources are 1-port SRS resources, wherein the processor is configured to invoke and execute the computer program stored in the memory to:

receive second terminal capability information, the second terminal capability information indicating that the terminal device supports SRS transmission on last K symbols of a slot, where K is an integer greater than 6.

17. The wireless communication device according to claim 16, wherein the processor is further configured to invoke and execute the computer program stored in the memory to: receive first terminal capability information transmitted by the terminal device, the first terminal capability information indicating that the terminal device supports the 1T4R-type antenna switching.

18. The wireless communication device according to claim 16, wherein the processor is further configured to invoke and execute the computer program stored in the memory to: receive third terminal capability information transmitted by the terminal device, the third terminal capability information indicating that the terminal device supports transmission of an aperiodic SRS configuration corresponding to the 1T4R type within one slot.

\* \* \* \* \*